US010603808B2

(12) United States Patent
Blenkinsopp et al.

(10) Patent No.: US 10,603,808 B2
(45) Date of Patent: Mar. 31, 2020

(54) PRODUCTIVITY ENHANCEMENT FOR BAND SAW

(71) Applicants: KANDO INNOVATION LIMITED, Auckland (NZ); Keith Blenkinsopp, Auckland (NZ); Donald Michael Oxley, Auckland (NZ); Winston Duang Wickham, Auckland (NZ); Jonathan Tee Wrigley, Auckland (NZ)

(72) Inventors: Keith Blenkinsopp, Auckland (NZ); Donald Michael Oxley, Auckland (NZ); Winston Duang Wickham, Auckland (NZ); Jonathan Tee Wrigley, Auckland (NZ)

(73) Assignee: KANDO INNOVATION LIMITED, Auckland (NZ)

( * ) Notice: Subject to any disclaimer, the term of this patent is extended or adjusted under 35 U.S.C. 154(b) by 0 days.

(21) Appl. No.: 15/506,914

(22) PCT Filed: Aug. 26, 2015

(86) PCT No.: PCT/NZ2015/050121
§ 371 (c)(1),
(2) Date: Feb. 27, 2017

(87) PCT Pub. No.: WO2016/032345
PCT Pub. Date: Mar. 3, 2016

(65) Prior Publication Data
US 2017/0252939 A1 Sep. 7, 2017

(30) Foreign Application Priority Data

Aug. 26, 2014 (NZ) .......................... 629440
Aug. 26, 2014 (NZ) .......................... 629445

(51) Int. Cl.
*B26D 7/24* (2006.01)
*B27B 13/14* (2006.01)
(Continued)

(52) U.S. Cl.
CPC .................. *B26D 7/24* (2013.01); *B27B 5/38* (2013.01); *B27B 13/14* (2013.01); *B27G 19/02* (2013.01);
(Continued)

(58) Field of Classification Search
CPC ....................................... F16P 3/142
See application file for complete search history.

(56) References Cited

U.S. PATENT DOCUMENTS 3,785,230 A * 1/1974 Lokey ................ B23Q 11/0092
30/388
4,026,177 A * 5/1977 Lokey .................. B23D 61/026
83/835

(Continued)

FOREIGN PATENT DOCUMENTS

CN 101540535 9/2009
FR 2673625 9/1992
(Continued)

OTHER PUBLICATIONS

International Search Report, PCT/NZ2015/050121, dated Sep. 25, 2015.

*Primary Examiner* — Gandhi Thirugnanam
(74) *Attorney, Agent, or Firm* — Young & Thompson

(57) ABSTRACT

Machine vision apparatus tracks a distinctive object in relation to a hazardous location on a work surface of a modified band saw in two, three, or four (3-D+T) dimensions, and calculates whether to send an "immediate shutdown signal" to the band saw. Cameras and an image processor are mounted on the band saw. The signal causes an
(Continued)

Figure 1:
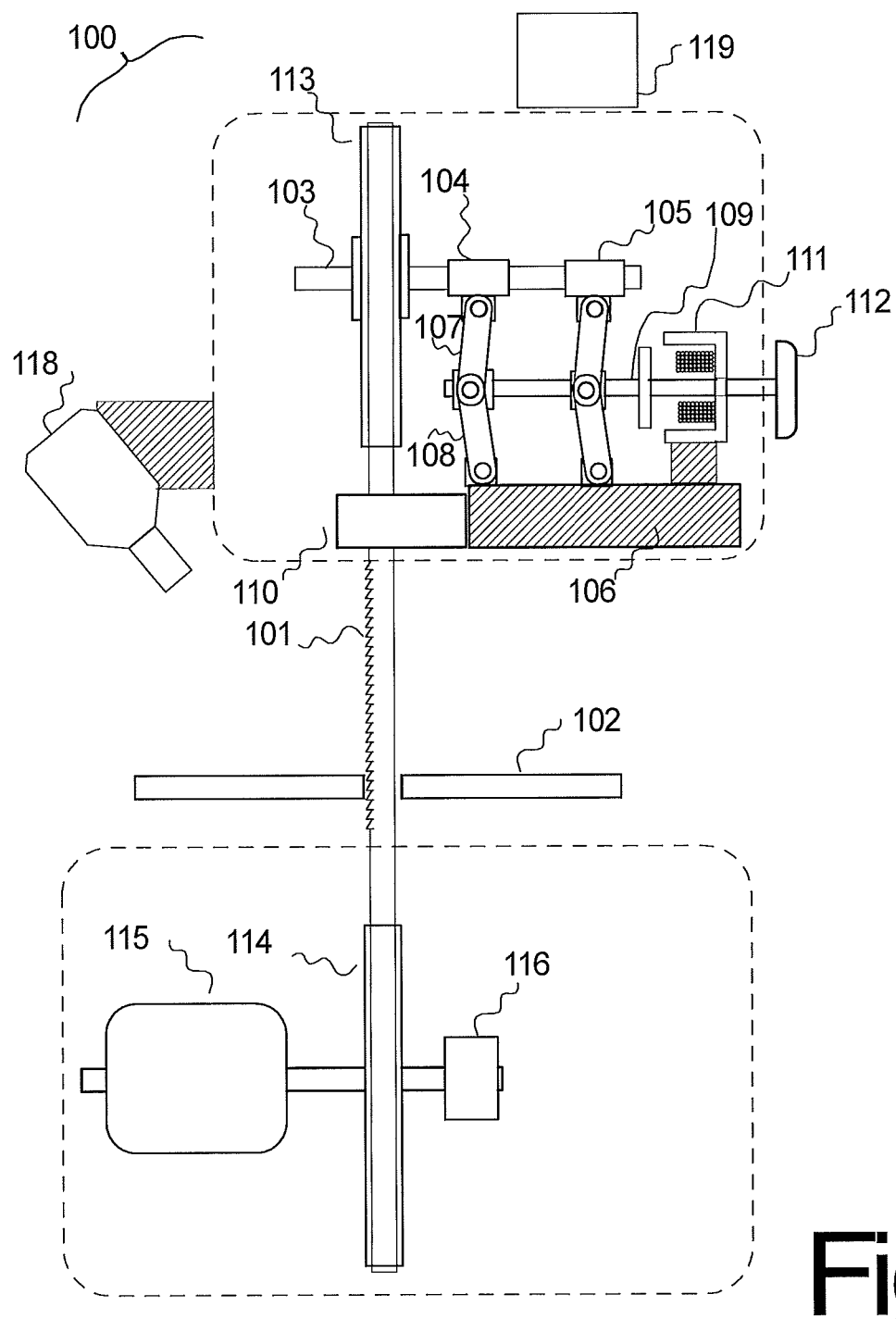

integrated blade-arresting or stopping mechanism to immediately shift the idler wheel, removing blade tension and disconnecting the blade which is then braked to a complete, safe stop before an approaching blue-gloved hand can touch the blade.

12 Claims, 5 Drawing Sheets

(51) Int. Cl.
    *B27G 19/06*     (2006.01)
    *B27B 5/38*     (2006.01)
    *B27G 19/02*     (2006.01)
    *F16P 3/14*     (2006.01)
    *H04N 13/239*     (2018.01)

(52) U.S. Cl.
    CPC ............ *B27G 19/06* (2013.01); *F16P 3/14* (2013.01); *F16P 3/142* (2013.01); *F16P 3/148* (2013.01); *H04N 13/239* (2018.05)

(56) References Cited

U.S. PATENT DOCUMENTS

| | | | | |
|---|---|---|---|---|
| 4,117,752 A * | 10/1978 | Yoneda | ............... | B23D 59/001 192/129 A |
| 4,702,137 A * | 10/1987 | Davidson | ............ | B23D 55/082 83/435.24 |
| 5,272,946 A * | 12/1993 | McCullough | ........... | B27B 13/14 192/129 A |
| 5,649,021 A * | 7/1997 | Matey | ...................... | G06K 9/46 348/65 |
| 6,462,811 B1 * | 10/2002 | Turner | .................... | G01B 11/00 348/125 |
| 7,792,328 B2 * | 9/2010 | Albertson | ............. | B60W 40/09 340/576 |
| 7,924,164 B1 * | 4/2011 | Staerzl | .................... | F16P 3/142 192/129 R |
| 2006/0096425 A1 * | 5/2006 | Keller | .................. | B23D 59/001 83/13 |
| 2010/0011926 A1 * | 1/2010 | Murakami | ........... | B23D 59/001 83/58 |
| 2010/0073461 A1 * | 3/2010 | Hammes | ............ | G01B 11/2545 348/42 |
| 2010/0300256 A1 * | 12/2010 | Loewe | ............... | B23Q 11/0082 83/72 |
| 2011/0001799 A1 * | 1/2011 | Rothenberger | .... | G06K 9/00771 348/47 |
| 2011/0048197 A1 * | 3/2011 | Winkler | ............. | B23Q 11/0092 83/58 |
| 2012/0081537 A1 * | 4/2012 | Arcand | ................... | F16P 3/142 348/86 |
| 2012/0123563 A1 * | 5/2012 | Drinkard | ................ | F16P 3/144 700/13 |
| 2012/0293625 A1 * | 11/2012 | Schneider | ............... | F16P 3/142 348/46 |
| 2017/0252939 A1 * | 9/2017 | Blenkinsopp | ............ | B26D 7/24 |
| 2017/0282397 A1 * | 10/2017 | Campbell | ............... | B27G 19/06 |
| 2019/0145577 A1 * | 5/2019 | Blenkinsopp | ............ | F16P 3/142 83/58 |

FOREIGN PATENT DOCUMENTS

| | | | |
|---|---|---|---|
| FR | 2703943 | 10/1994 | |
| WO | WO86/06816 | 11/1986 | |
| WO | WO-2017196187 A1 * | 11/2017 | ......... A22C 17/0006 |

* cited by examiner

PRODUCTIVITY ENHANCEMENT FOR BAND SAW

FIELD

This invention relates to powered machines of the type in which an operator feeds material to be processed toward an active or hazardous region; more particularly to saws, and especially to band saws. This invention provides safety shut-down means for the powered machine, including means to detect a hazard and rapid response means. In particular this invention relates to modifications to a band saw machine so that motion of the cutting blade can be arrested quickly in response to a dangerously close approach by a person's hands.

BACKGROUND

Band saws are inherently a high-risk piece of machinery, since an operator's hand is often the means used to push material to be sawn toward the moving blade. A substantial number of injuries result from use of a band saw as is common in meat processing plants to dismember carcasses. Any person operating a band saw must remain alert while working an entire shift, since the human hand that manipulates the meat being cut is as vulnerable to the saw as is the cut of meat. Other industrially applied, hazardous mechanical cutting or compressing equipment exists.

Physical guards are known. Devices to hold cuts of meat are known. Conductive gloves are known from a number of patent documents. No prior art describing an effective and reliable way to locate an operator's hand in sufficiently close proximity to a cutting blade of a bandsaw to be at risk, and then to halt that blade safely before damage to the operator's hand can occur is known.

An improved guard would reduce the present high rate of hand injuries arising from use of band saws, thereby raising productivity of a work place, reducing often substantial and sometimes permanent injury, and avoiding time off by skilled persons.

"Video safety curtains" are a conceptual description of optically based virtual protection means; used for example in car assembly factories when robots are operational to minimize risk that a human operator may collide with a slewing robot.

PRIOR ART REVIEW

It is noted that the prior art CPC class B28B 13/14 combines hazard detection apparatus integrated with hardware reaction means within apparatus in order that the danger is quickly abolished. The present invention provides such an improvement for a band saw or like hazardous machine. One part comprises on-board means for signalling a dangerous state, when an operator's hand or hands are at risk from the machine, and the other part comprises built-in rapidly responding mechanical means to halt blade movement in anticipation of likely injury.

U.S. Pat. No. 4,026,177 (circular saw) and U.S. Pat. No. 3,785,230 (circular saw) describe an emergency stop that employs the blade as an antenna of a capacitative proximity sensor based on a capacitance proximity sensor, and applies a gripping brake applied from both sides if required. Another brake is a sacrificial rubber wedge driven against the cutting teeth. Similarly, U.S. Pat. No. 4,117,752 (band saw) describes an emergency stop using an amplifier sensitive to electric charge to interrupt the motor current and activate an electromagnetic brake or brakes when part of a human body makes electrical contact with the band blade.

U.S. Pat. No. 5,272,946 (band saw) describes an emergency stop that is set off by closure of an electric circuit including the blade and a conductive glove, disconnects the power drive, applies two or three separate brakes, and moves the blade in a reverse direction by a small amount in case the teeth had "hooked" the person's hand. FR2703943 Lhuillier J C (band saw) describes disengagement of the blade and braking the blade in response to contact by a conducting glove. The entire upper section of the bandsaw is allowed to drop in order to disengage the blade from the drive wheel. These inventions involving special conductive gloves share the problem that no safety response can begin until contact is made. The blade has perhaps 50 milliseconds to cut into the glove. These are injury-mitigating inventions rather than injury-preventing inventions. If the wire to the glove is already broken the invention enters a "fail-dangerous" mode.

Hoøgsholm (WO86/06816 band saw) describes an optical proximity sensor. Chopped ultraviolet light is directed down to the hazardous area around the blade. A photocell detects fluorescent light emitted from a special glove at the chopping frequency, if it is within the illuminated and protected area. The equipment is said to detect a transgression in less than one millisecond, but the completion of a safety response in terms of blade stopping was not stated.

CN201540535 describes use of blue gloves, or partially blue gloves to provide a non-contact human:computer interaction system, wherein the humans are actors. This does not cover operation of hazardous machinery such as a band saw used continuously in a meat works, does not relate to the colour contrasts between meat products and blue gloves, and includes no means for halting a saw.

Some prior art includes destructive processes to halt the band saw blade before injury is caused. Destructive processes necessitate blade replacement each time and adversely affect productivity. Unless damaged, one sharp band saw blade can last for 4-8 hours. The term "productivity enhancement" embraces a greatly reduced rate of injury, better working conditions, and reduced number of blade replacements.

OBJECT

An object of the present application is to provide a productivity enhancement for a band saw in two integrated parts: one part comprising means for continuously watching a dangerous zone and then creating a signal when an operator's hand or hands are determined to be at risk with respect to the zone and the other part comprising a rapidly acting blade halt means responsive to the signal, or at least to provide the public with a useful choice.

SUMMARY OF INVENTION

In a first broad aspect the invention provides apparatus to be integrated with a hazardous machine including a mechanically driven cutting blade capable when in use of cutting an item to be processed when the item is pushed by a worker's hands over a working surface and against the blade, wherein the apparatus includes in combination (a) hazard identification means employing machine vision means included with analysis means capable when in use of determining the position, in relation to one or more predetermined hazardous zones, of one or more parts of said hands in relation to the position of the cutting blade, and (b)

modifies the machine in order to include means capable when in use of stopping the blade as soon as a hazardous situation is recognised by the optical imaging and image analysis means.

In one option, the hazardous machine comprises a modified band saw having a toothed steel blade in the form of a closed loop that passes around and is driven when in use by a drive wheel and passing around at least one idler wheel.

Preferably the hazardous zone is deemed to be surrounded by a surrounding zone and the optical imaging and image analysis means is made capable of detecting and signalling presence of the operator or part thereof in the surrounding zone, thereby providing an intangible barrier around the hazardous zone and of providing a command signal to the means to stop the blade.

Preferably the surrounding zone is deemed to be surrounded by a supervised zone and the machine vision means is made capable of detecting and interpreting movement of the operator or part thereof within the supervised zone, thereby providing an intangible barrier around the hazardous zone.

Preferably the optical imaging and image analysis means is made capable of signaling presence of a potentially hazardous movement of the operator or part thereof within the supervised zone and of providing a command signal to the means to stop the blade.

Preferably the operator's hands are made recognisable to the optical imaging and image analysis means by having the operator wear gloves during an entire work session; the gloves having a visible colour distinctive to the machine vision means from any colour of the material being processed.

For a meat industry application in which the band saw is used, the gloves are preferably coloured in a blue colour in order to form an effective colour contrast against a background of muscle, tendon, bone and the like.

Preferably the gloves are blue rubber gloves.

Preferably the optical imaging and image analysis means comprises an installation of two imaging cameras fixedly mounted on the apparatus and directed toward the working surface; each camera forming an a repeated series of data frames that represents the hazardous zone from a separate perspective.

In another aspect, the optical imaging and analysis means comprises at least one imaging camera responsive to blue light and at least one light source; capable when in use of providing a repeated series of data frames; each frame having a vertical axis, a horizontal axis, and an array of brightnesses within the frame; comprising an image including from time to time images of the worker's hands.

In a first subsidiary aspect the optical imaging and image analysis means includes image analysis means capable of receiving a series of images from said at least one imaging camera and discriminating from other pixels in the or each image those pixels having the contrasting colour, In a first subsidiary aspect the optical imaging and image analysis means receives a type of video signal comprising a two dimensions image having an X-Y array of pixels and extracts a derivative of the image representing the position of blue glove pixels while diminishing artefacts.

Preferably the optical imaging and analysis means comprises a pair of imaging cameras each fixedly mounted on the apparatus and directed toward the working surface and forming an image from a different perspective that represents the hazardous zone.

In a second subsidiary aspect the optical imaging and image analysis means is provided with a pair of spaced-apart imaging devices and the stereo machine vision means so produced is provided with three-dimensional processing means capable of converting images received from the pair of spaced-apart imaging devices into a three-dimensional derivative of at least one image representing the position of blue glove pixels comprising an object, maintaining three-dimensional references, as constants describing the hazardous zone and the surrounding zone as volumes each having a width, a depth and a height, establishing the position of each object in relation to a surrounding zone delimiting the hazardous zone of the cutting blade and establishing which portions of the or each object comprises a potential conflict, repeatedly assessing the distance from each conflict object to the hazardous zone, and in event of determining an unsafe situation, transmitting the SIGNAL from the machine vision means to the band saw, causing a reversible mechanism, including receiving means for the SIGNAL, to transform the band saw into a safe state.

Preferably the optical imaging and image analysis means includes computing means capable of comparing frames simultaneously derived from the separate cameras and of thereby computing object positions in a height or Z axis; thereby resolving a position of the or each object in an X-Y-Z or 3-D coordinates.

Preferably the optical imaging and image analysis means employs artefact-minimising procedures selected from a range including: high colour contrast, good lighting, sharp focus, binning, smoothing, filtering including median filtering, and minimum contiguous pixel numbers or boundary determinations, in order to ensure that the data on which a SIGNAL decision is to be made is reliable.

Preferably the optical imaging and image analysis means includes computing means capable of maintaining records of positions of recently located objects over time, thereby maintaining tracks of said objects, and of determining an object velocity for each object and thereby of evaluating a corresponding risk based on object velocity in the supervised zone and of transmitting the SIGNAL in event of any object moving at a greater velocity than has been deemed safe.

In an option, the optical imaging and image analysis means includes computing means capable of maintaining records of positions of recently located objects over time, thereby maintaining tracks of said objects, and of determining an object velocity for each object and thereby of evaluating a corresponding risk based on an estimated trajectory, extrapolated over a period into the future, that will reach the hazardous done before the SIGNAL would have had time to transform the band saw into a safe state.

Preferably said transform time is stored as a constant.

Preferably the machine vision method and process is capable of calibration and recalibration from time to time, including during a start-up procedure for the band saw.

Desirably the apparatus includes self-monitoring means capable of ensuring that any failure will result in a safe condition.

Preferably the apparatus includes self-monitoring means for ensuring a safe maximum braking time; the self-monitoring means comprising a process of running the band saw up to an operating speed while verifying saw movement speed, and generating a SIGNAL to cause the blade to stop, and verifying that the blade has stopped within a predetermined time limit; wherein a saw movement speed verification means relies on periodic interruption of a light beam by the teeth of the band saw blade.

Optionally the machine vision means responds to a lower assessed risk at a time that the distance remaining starts to increase, by (a) generating a warning signal to the operator, (b) maintains a count of transgressions during a working shift or (c) generating an alarm signal sent to a supervisor.

In a second broad yet related aspect the apparatus comprises mechanical means to bring a moving band saw blade to an abrupt and complete stop; the means including a first means responsive to the SIGNAL to remove a working tension from the band saw blade, thereby changing the moving blade from a state of being connected by a static frictional grip around at least one rotating idler wheel and from a rotating drive wheel to a state of being disconnected from said wheels, and a second means, comprising braking means responsive to the SIGNAL to bring the moving and now mechanically isolated blade to a complete stop.

Preferably the first means comprises axis of rotation displacement means capable of shifting an axis of rotation of at least one idler wheel closer to an axis of rotation of the drive wheel, thereby releasing a previously maintained tension within the band saw blade and of disengaging the band saw blade from the or each wheel.

Preferably release of a supported idler wheel supporting the blade under tension originates from a dislodgment of a catch subject to a force vector arising from tension within the blade but normally maintained in position by a support capable of being dislodged from position by actuation of a solenoid, thereby providing additional force to drive the axis of rotation displacement means.

In a subsidiary aspect the means comprising release of a supported idler wheel bearing from a catch includes a pivoted lever maintained in an over-centre locked position during normal use, and tripped by an actuator on receipt of a SIGNAL, thereby allowing the idler wheel to be pulled into a position releasing tension from the blade.

Preferably also, the means to bring the moving saw blade to an abrupt stop comprise application of pressure from rotation of a rotatable brake shoe, through the moving saw blade, and against a fixed brake shoe; said pressure preferably arising from interruption of current through a solenoid actuator.

Preferably the combination of means is capable of performing a manually initiated self-resetting and self-powered procedure in order to restore a band saw that has been made safe after responding to a SIGNAL into a band saw that is usable.

In a further related aspect the machine vision means is further integrated with the band saw so that a controlled starting process is provided involving presenting a check list to the operator by means of a display device carried upon the band saw that presents each step in a sequence.

PREFERRED EMBODIMENT

The description of the invention provided herein is given purely by way of example and is not to be taken in any way as limiting the scope or extent of the invention. In particular references to a "band saw" are made by way of example only, in order to illustrate the invention, which is applicable to other manually fed machinery.

The invention has been described in an illustrative manner, and it is to be understood that the terminology which has been used is intended to be in the nature of words of description rather than of limitation.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in their entirety by reference. Reference to cited material or information cited in the text should not be understood as a concession that the material or information was part of the common general knowledge or was known in New Zealand or in any other country.

DRAWINGS

FIG. 1: is a diagram of a band saw with an idler wheel dropping mechanism.

Figure 2:
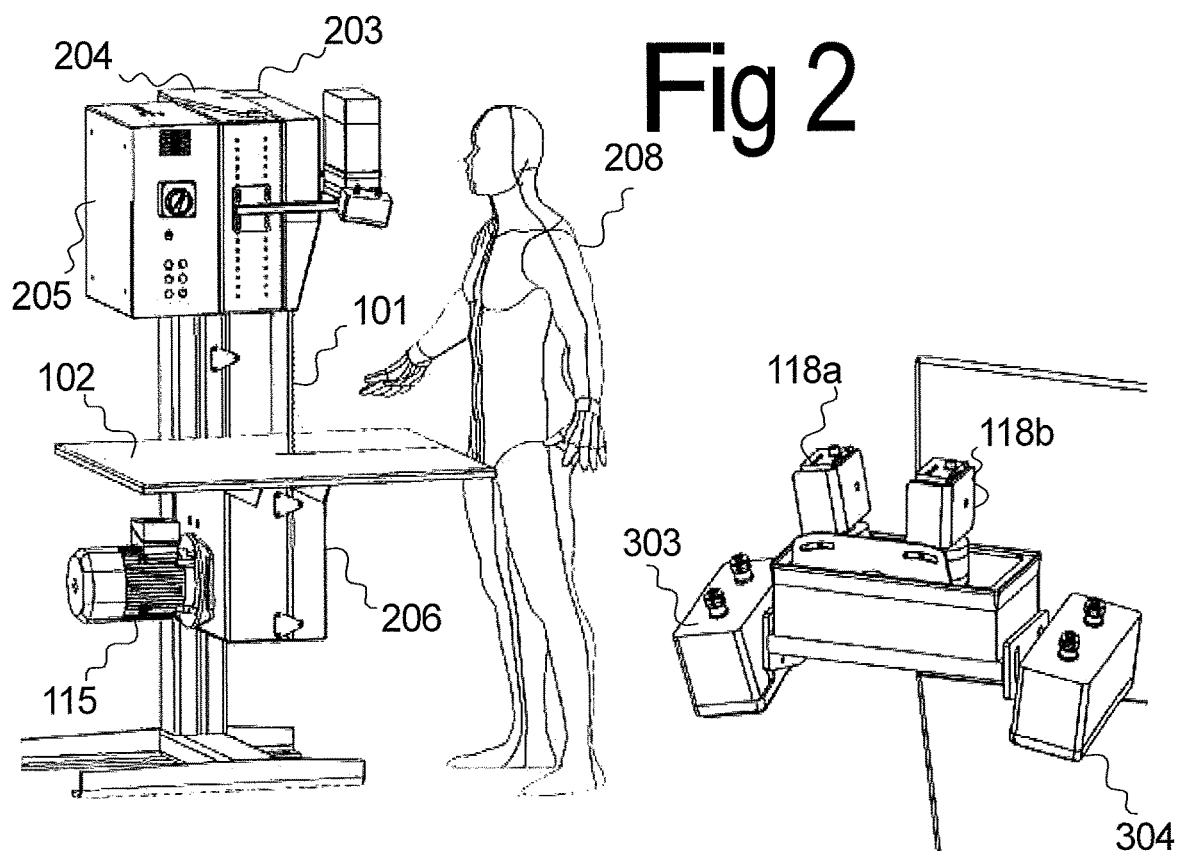

FIG. 2: shows a modified band saw according to the invention, including safety means for the operator.

Figure 3:
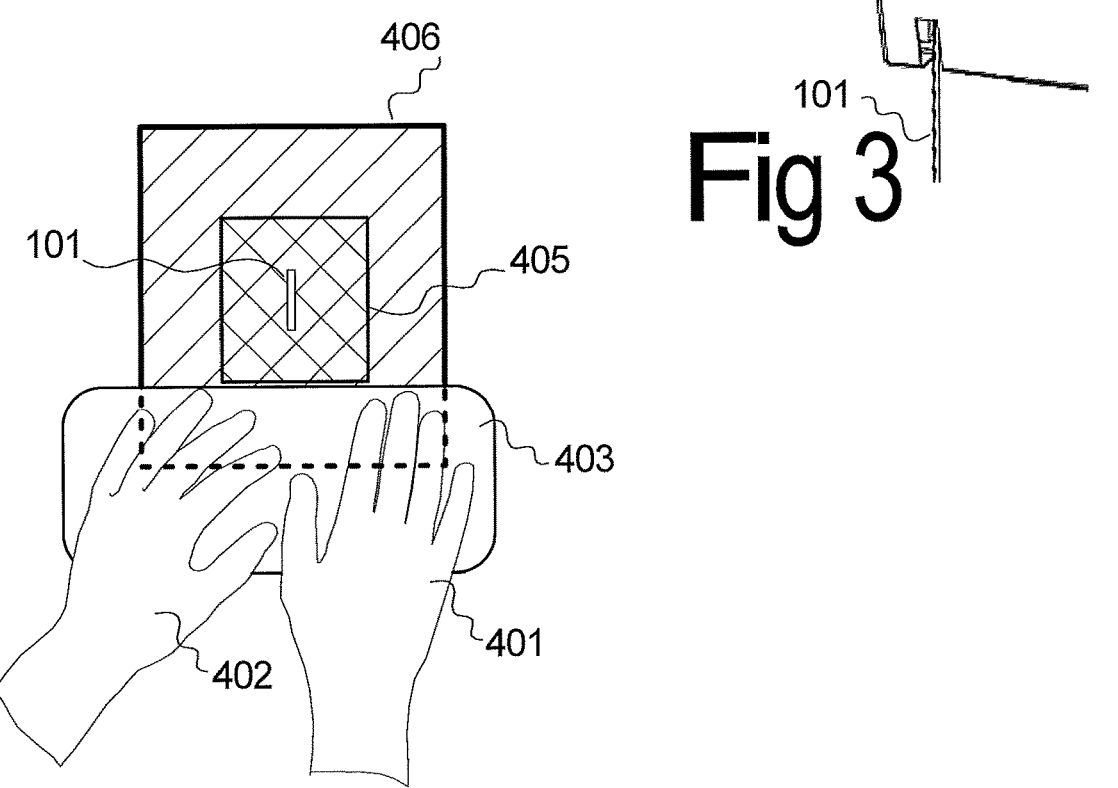

FIG. 3: is an oblique view of the lights and cameras for a 3D version of the invention.

Figure 4:
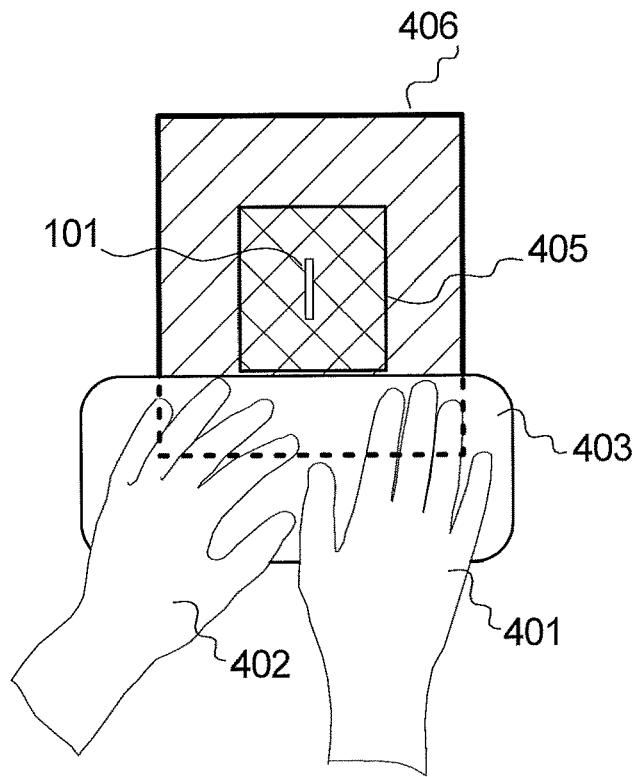

FIG. 4: is a schematic of the protected areas upon the work surface 102.

Figure 5:
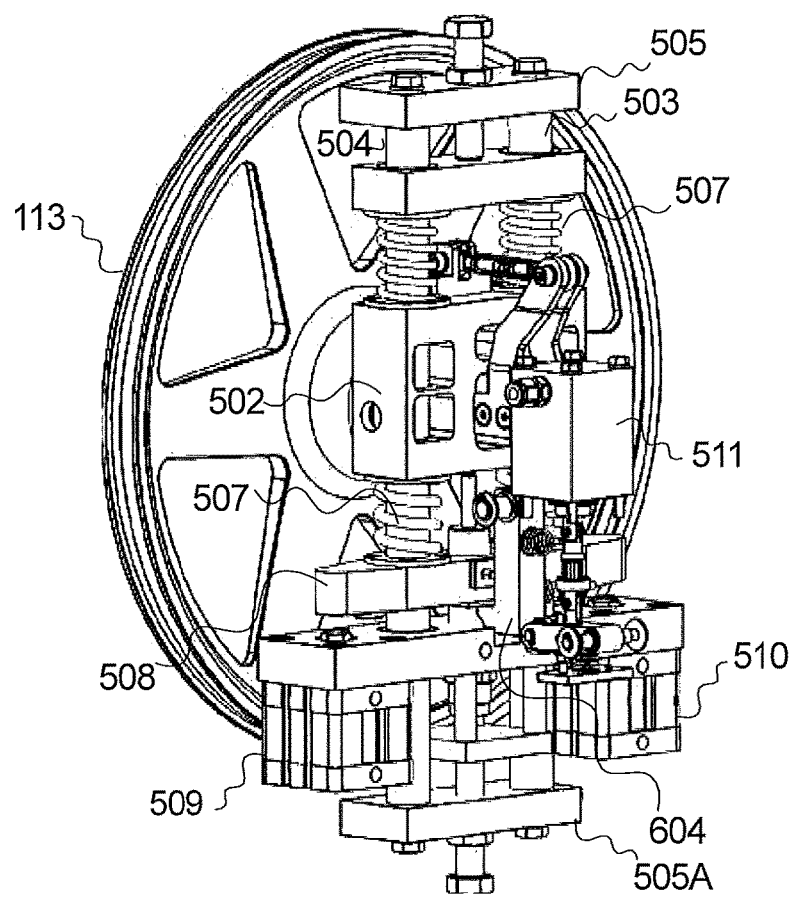

FIG. 5 is an oblique view of a second idler wheel dropping mechanism.

Figure 6:
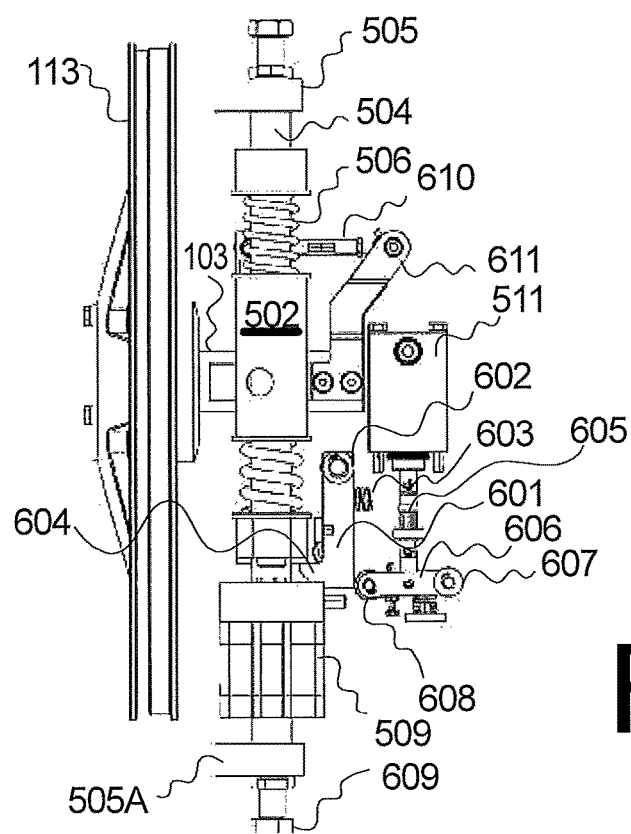

FIG. 6: is an end elevation view of the second idler wheel dropping mechanism.

Figure 7:
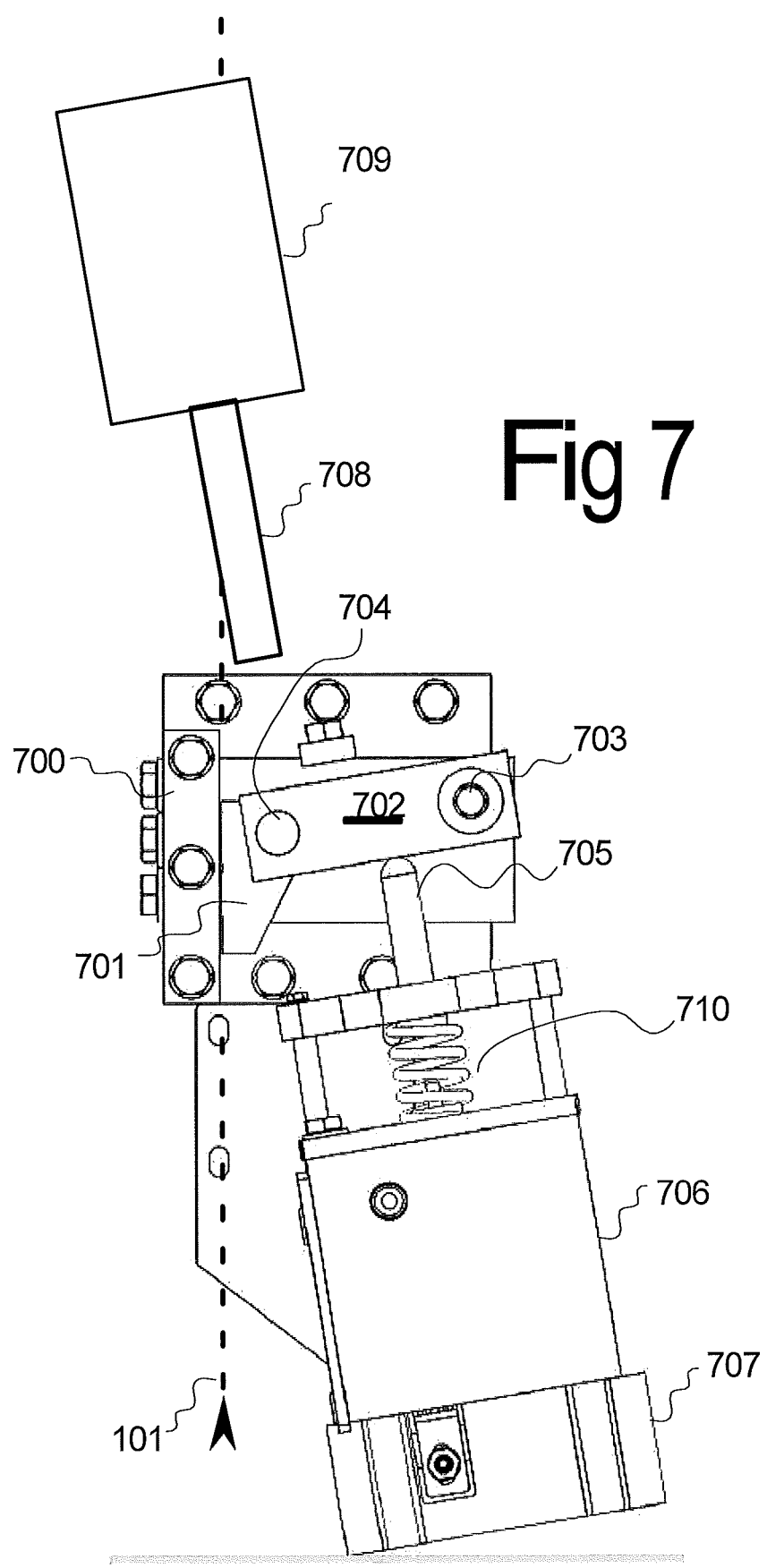

FIG. 7: is an elevation view of a caliper brake to stop the decoupled blade.

Figure 8:
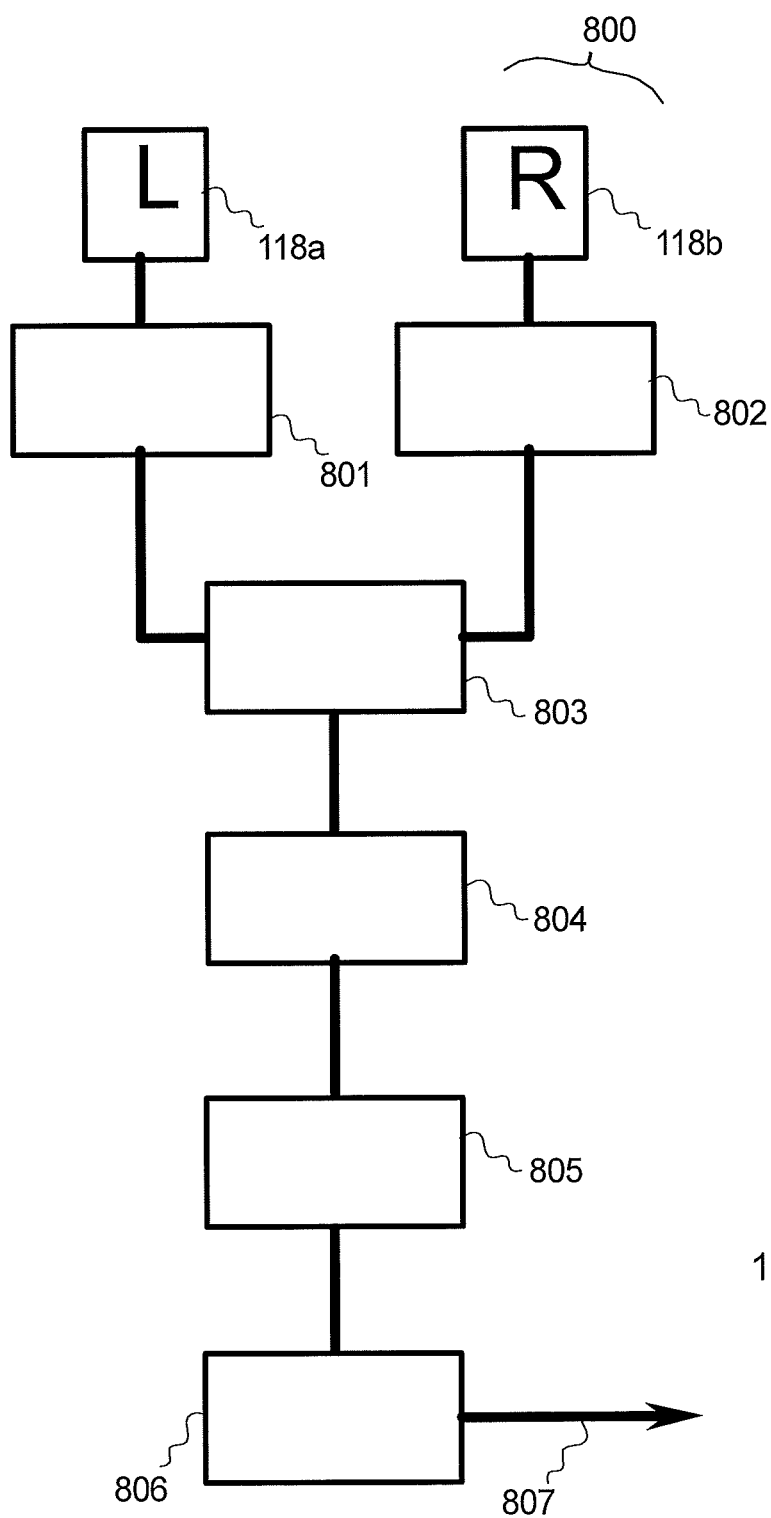

FIG. 8: is a block diagram of steps in example software.

FIGS. 9 as 9a, 9b and 9c are drawings from a video record, showing a response.

INTRODUCTION

A "video curtain" type of guard to protect a person against injury when using a modified hazardous machine is described. Machine vision apparatus uses overhead cameras to track the instantaneous location of a visually distinctive object over a machine work surface in at least two dimensions (X-Y) and assesses the risk of danger to that object in relation to a hazard at a fixed position on the surface. The visually distinctive object is declared in this Embodiment to be an operator's hand inside a blue glove. One improvement adds 3D (X-Y-Z) vision so that a protected volume is created. Another improvement tracks the movement of the object over time (X-Y-Z-T) and can anticipate if or when an object already detected but far from the hazard might inadvertently reach the hazard if it continues in its present path.

The machine vision means generates an "immediate shutdown signal" command (herein referred to as "SIGNAL") and sends it to process control means within the hazardous machine. Action avoids injury and damage. This specification primarily refers to a band saw on which dismembered carcasses or parts are cut up by an exposed blade moving at a speed of typically 1400 feet per minute, as used industrially for butchering or rendering purposes in a meat or poultry plant. A skilled addressee will be aware that the concepts disclosed here can be applied to a variety of other hazardous machines such as in sawmills and presses, even noodle rollers.

FIG. 1 and a related description (see later) shows a first version of a band saw modified by provision of blade detensioning means, on reception of a SIGNAL. FIGS. 5, 6 and 7 and associated text describe a second version in more detail.

FIG. 2 shows a band saw incorporating a version of the invention, in which an operator (208) is standing in front of a work table (102) that has a conventional slot through which a toothed blade or band (101) passes. (118) indicates attached cameras and lights in general. (203) houses the idler wheel, now having a modified axle support. Items under the work table (115)—a motor, and (206)—a housing for a drive wheel, are conventional. The drive wheel itself is not shifted during action of this embodiment. This band saw is provided with a housing 204 to conceal the idler wheel dropping means (see later) and a housing (205) concealing the blade halting control equipment. Housing 204 also conceals blade tension resetting means (see FIGS. 5 and 6) so that work can be continued after resetting is done. Note that the same principle cam be applied to a band saw in which the motor is above the work surface and the idler wheel is below.

FIG. 3 shows a preferred location for two colour or blue-sensitive cameras (118*a*, 118*b*) (here called "L" and "R") to collect the images to be analysed. These examples operate at a 6 millisecond (mS) frame rate and are mounted about 1 metre above the work surface. Each one is at a slight angle to either side of the blade 102 so that none of the work surface is hidden from both cameras. The lenses and cameras are selected to cover an area on the work table (102) of about 400 mm×400 mm. For good depth of field the camera lenses are stopped down so that a sufficiently sharp image has at least a 400 mm depth. For low noise with these cameras when the lenses are stopped down a white light of at least 1500 lumens on the surface is provided by LED lamps (303, 304) to each side of the cameras.

According to the invention, proximity detection for the operators' hands relies on the operator wearing gloves (401, 402) that are coloured blue, which is already a normal practice in the meat and poultry industry. Blue enhances contrast. Blue stands out from the red of muscle, the creamy white of bone, or the white of tendon and ligament. Therefore this specification will use "blue" as a term to describe a distinctive hue for use in at least the meat industry. Then the proximity detection problem becomes one of detecting the positions of blue objects in a field of view. The skilled addressee will be able to relate the following 3D description to a 2D, single camera version.

With reference to FIG. 4 showing an operator's view of the working area, the hazardous zone is defined as the zone occupied by the band saw blade (101). A virtual surrounding zone (405) within which detection of a blue glove causes the machine to stop is comprised of an arbitrarily determined safe distance of perhaps 50 mm from the blade to left, to right, toward the operator, and away from the operator. The machine vision equipment is intended to supervise the positions of blue objects (such as gloved hands 401 and 402) in a virtual supervised zone (406) extending over most or all of the entire work surface (102), and take action if any recognised object appears to be in a dangerous state; such as if the object is moving quickly.

As will be described below, frames of data take 20-30 milliseconds (mS) to be processed through a series of steps to make a SIGNAL or not, using a computer processor located in an equipment compartment attached to the band saw head. Physical halt of the blade should take up to 24 mS after receipt of the SIGNAL. The apparatus is designed to test the braking speed from time to time, employing a beam of light transmitted past the blade teeth where it is interrupted or modulated by the passing teeth as a transducer of blade motion. If the time to brake exceeds 40 mS the machine enters a disabled state and maintenance is requested. It will remain disabled until serviced. Both steps—connecting and braking—are initiated at the same time in the present embodiment since inherent physical delays provide that the brake does not try to work against the idler and drive wheels while stopping the blade.

Cameras (118*a*) and (118*b*) are mounted on the band saw frame as per FIGS. 2 and 3. The cameras' outputs are digitized and, as shown in block diagram FIG. 8, are separately processed in blocks (801) and (802) in order to discriminate "a relative amount of blueness only" in each pixel—while rejecting intensity variations as might arise within a shaded area. Such a simplified frame representing colour alone, independent of brightness, is convenient for subsequent processing. Suitable selection of working conditions; glove colour and lighting minimized a need for frame "cleaning" of any kind such as for noise cancellation. A recognised "object" to be tracked should comprise a contiguous array of blue pixels corresponding to both gloved hands if in the frame, or may represent each finger of the gloved hand. It may be suitable to use a central member of an edge of an X-Y array of nearest-to-hazard detected pixels—which would look like an arc facing the blade (101) if seen on a screen, to represent each object. (A line-based recognition technique, seeking speed, is described below).

Each pair of L and R frames are combined, and X and Y positions of corresponding shapes in each frame are compared. On taking viewing point separation into account this part of the image processor (803) computes a relative height or Z position for each shape. The objects are now located inside a three-dimensional (3-D) volume, meaning that the height of the exposed blade (101) in FIG. 2 is surrounded by a 3-D surrounding zone; entry into which by a recognized object causes the band saw to halt. 3-D processing techniques derived from left and right image comparisons are well-known to the reader skilled in the art.

Stored constants defining the actual hazard zone as a volume are compared with the located identifiable shapes in block (805), in order to determine the distance of the closest point of any one "blue object" or blue glove (401,402) to the hazard. In this description, the hazardous zone is defined as the zone occupied by the cutting teeth of the band saw blade (101). The invention protects gloved fingers from likely contact with the cutting teeth by stopping the blade immediately if an identified object (gloved finger or hand (401 or 402)) enters a cubic shape, the surrounding zone that is also as high in the Z axis from the table surface as is the height of the hazardous zone—the exposed blade. A cubic surrounding shape aligned along Z and Y axes is easier and quicker to process than a rounded or angled shape, although any shape could be represented in a lookup table. The surrounding zone is surrounded by a supervised zone.

It will be appreciated that meat to be sawn (403) has a relatively low proportion of visible blue content as seen by the cameras. (White areas, also having high blue, are matched by high red and high green content pixels). Therefore approach of meat alone to the blade (101) across the surrounding zone is not noticed and does not cause the band saw braking process to be activated.

According to this approach detection of an object having sufficient contiguous blue pixels that is located within the surrounding zone will immediately send the SIGNAL along channel 807, probably a wire, to operate two actuators (511 and 706) via conventional process control equipment. Computer "intelligence" allows the equipment to anticipate a problem and take action in advance in case a quickly moving hand hits the blade (101) before the blade can be brought to rest in a suitably controlled way. Perhaps a quick movement is unlikely. But accidents tend to happen in unpredictable ways. The invention is unlikely to protect an operator who does not use a distinctive glove—assumed herein to be blue.

One method for adding a time element is to maintain an (X-Y-Z-T) table of an appropriate number of the most recent X-Y-Z positions over time for each of n separately recognized objects. Each new record would displace the oldest record for each object. After adding each new record, the processor calculates a three dimensional vector to assess where the recognized object will be at a selected moment in the future, taking into account how long the band saw blade takes to be stopped. For example, if the vector, extrapolated forward beyond the present time by an example maximum braking time of 30 mS will transgress the hazardous zone or the surrounding zone, the SIGNAL is made, immediately bringing the blade to a halt.

Another method is to declare that any blue object detected outside the surrounding zone as moving at a predetermined dangerous speed of more than for example 3 metres per second will cause a SIGNAL to be made.

At this time one preferred method for speeding up processing is to dissect the X-Y planes from the cameras inside block 803 into a series of perhaps 16 separated virtual horizontal lines, as if the cameras were line scanners. Then the virtual analysis point simply travels along all lines, determining if the pixel at the point is blue or not, and stops travelling and reports a position in X, Y when the pixel is not blue. The actual positions of the lines in the Y axis is changed from frame to frame so that over a short period of time the entire frame is covered and the objects become defined by their edges. This dissection might not be required if faster processors were used.

Perhaps one image or pair can be taken in before the previous image, received 6 mS earlier, has been completely processed. A number of separate image analysis procedures may be maintained in parallel, like a round or perpetual canon in music; each frame (or pair of frames) being processed at one stage while other frames are at different stages. A processor with 4 cores, for example, could handle one analysis process image in each core, combining the SIGNAL outputs, and possible control-panel commands with an OR function.

In the Example, software is written in a high-level language such as C++ and care is taken to ensure that the operating system (which may be Windows®) is not able to interrupt this time-critical image analysis for non-relevant purposes. For example, interrupt priority settings that the operating system might use are set at a lower priority than this image analysis process. Safety requirements dictate that this apparatus is made "fail-safe" throughout—that is, if anything goes wrong, the blade is halted immediately. For example at the brake itself, power is continuously applied to solenoid (706) during normal use to pull a spring-loaded armature into the device and keep the brake off. If there is an interruption to power, the brake is applied. The image analysis software is written with checks in order to ensure that it will default to a safe basis in event of, for example, software or hardware failure. One way to maintain safe software is to include at least one independent "watchdog timer" perhaps in separately powered electronic hardware apart from the computer electronics itself, which will count up to a preset maximum and issue an immediate-halt SIGNAL if it is not reset to zero frequently by the software such as each time the program completes a software loop. Other means include maintaining and testing checksums, as will be known to a person skilled in the software arts.

The blade decoupling mechanism, controlled by the SIGNAL, will now be described.

FIG. 5 is an oblique view, and FIG. 6 is an end elevation view of the resettable mechanism to decouple the band saw blade (101) about an idler wheel in event of a dangerous situation. A skilled reader will realise that a band saw in which the motor and drive wheel are above the work surface and the idler wheel is located below can be modified according to the same principles in order to install a blade decoupling mechanism, since blade tension is a dominant force.

The blade (101—not shown here) passes around the idler wheel (113) and in normal use is maintained in substantial tension by the shaft (103) of the wheel, mounted on bearings inside block (502), being placed in a "tension position". Block (502) can slide vertically along a pair of fixed rods (503, 504) anchored at each end in a fixed block (505, 506) and provided with end adjusting bolts such as 609. Block (502) is pressed up by pressure from compression springs 385 (507) around the rods, the springs being supported on a releasable, sliding block (508) which has been pushed up along the two rods by pneumatic actuators (509, 510), during a "Set and Recouple" process. The travel is controlled by a limit switch (not shown). On reaching a working position the catchblock (502) is locked in place by a tooth (604).

The analogue to the over-centre actuator of the early version as illustrated in FIG. 1 is a release mechanism for the catch block (601) and tooth (604) at one end and a pivot mount (602) at the other end; with pressure applied through spring 603). The SIGNAL from the machine vision unit or from an operator emergency stop button (not shown) causes actuator or solenoid (511) to push rod (605) down, so that beam (606) which is supported by pivot (607) at one end is pushed down and the support wheel (608) at the other end is pushed over centre, removing support from the tooth (604) on block (601). Tension in the band of the band saw gives rise to a release force applied to tooth (604) along a vector that is down and to the right. The now unsupported tooth (604) releases the block (508). The idler wheel (113) on its shaft (103) supported by block (502) rapidly falls over a short distance, sufficient to take tension off the saw band (101—not shown in FIG. 5 or 6) and decouple the saw band from the rim of the idler wheel (113) so that braking can immediately take place (see in relation to FIG. 7). The rate of idler wheel acceleration is significantly greater than the force of gravity (g) because of the tension in the band and because of released compression in springs (506, 507), in combination with the mass of the idler wheel alone.

A skilled addressee will appreciate that other permutations of the apparatus such as to hold and then release the idler wheel may be created. This mechanism is compact and is quick to operate.

FIG. 7 illustrates an effective blade braking mechanism used in company with the decoupling mechanism to bring the blade (101 which is shown diagrammatically in part of this drawing as a dashed line) to a halt. The mechanism is securely mounted toward the rear of the band saw housing and acts upon the blade (101) as it rises up toward the idler wheel after turning around the drive wheel. A caliper brake uses a securely fixed metal block (700) mounted on a rigid base as one shoe. A pivotally mounted brake shoe (701) of metal can press the sides of the blade, but not the teeth, against block (700) thereby causing substantial friction without imposing any significant curvature on the blade, and without touching the teeth. It has been estimated that about 200 J of power is taken from the moving blade and dissipated as heat within the block over 24-30 milliseconds (mS) and over about 10 mm of blade length during a braking action. There would be much more power to transfer, and a much longer braking process, if the idler wheel, drive wheel and motor also had to be slowed to a stop through the saw blade with this brake. There may be residual friction between the blade and the still spinning driver and idler wheels. Those parts may be stopped more quickly such as by application of other brakes (not shown) and by disconnecting the motor (115) from a supply of electricity or applying reverse power to the motor.

A powerful solenoid (706) is normally ON during use and holds the brake in a released state. When de-energised by the SIGNAL, rod 705 is pushed up against block 702 by spring pressure (spring 710). That block is pivotally mounted by pivot (703) so that second pivot (704) which holds the brake shoe moves up and in an arc toward the position of blade (101), forcing the brake shoe into frictional contact with the blade. Usually the solenoid remains de-energised for sufficient time to ensure that all motion has stopped and the blade will not start to move if the brake is released too soon. The dissipated power may cause the brake to stick in place, depending on any coating over the blade. Brass is a currently preferred brake shoe material, since steel tends to form welds. In this version a pneumatic release actuator (709) is placed above the brake assembly in order to extend a rod (708) toward the brake shoe mount (704) under process control when the actuator is operated during a "reset" procedure and force the brake to open. Motion of the rod (708) can be monitored by a limit switch (not shown) so the control apparatus can sense whether or not the brake has actually been released.

Turnbuckle 610 and arm 611 are part of an idler wheel angle trimming assembly used to ensure that the blade runs true.

An alternative version of the idler wheel dropping mechanism is now described.

Reverting to FIG. 1, a modified band saw (100) of the type used in the meat industry and in boning-out rooms, comprises a horizontal working surface (102) through which is passed a vertically directed cutting edge produced by passage in a first direction (down) of a metal tooth-bearing band (101). The band is a closed loop passing around a large motor-driven driving wheel (114), returns along a path remote from the working surface and closes a loop around a large idler wheel (113), above the working surface. Usually the driven wheel and motor (115) are under the working surface and the idler wheel is above. As always, the driving and idler wheels have parallel axes of rotation and are mounted at an inter-axis spacing that provides, during normal use, that the metal band (101) is maintained in elastic tension while not extended into a region of ductile flow.

FIG. 1 includes an example mechanism including an "over-centre" mount made of sets of two articulated levers as (107) and (108), inside a housing shown by dashed lines. The over-centre mount is tripped by an electrical signal energising the solenoid actuator (111), to pull shaft (109) to the right, and as a result to physically move idler wheel (113) by its shaft (103) downward and closer to the drive wheel (114). This motion includes an "over-centre" mechanism implicit in the knuckled joints between beams (107, 108) and the second pair, that support bearings (104, 105) of the shaft (103). As a result of moving idler wheel (113) downward and closer to the drive wheel (114), tension in the blade that gave rise to static friction that coupled the saw blade (101) to the driver wheel (114) and the idler wheel (113) is removed and the blade can be stopped by a braking means (not shown) without having to stop the spinning wheels (113, 114) and motor armature (inside 115).

If a solenoid (111) is employed, it may be energised for example by passing a half-cycle of mains power through the winding using a thyristor as a control means, thereby pulling shaft (109) to the right, past the over-centre point of balance. A preferred solenoid is designed for a powerful impulse, such as to not reach magnetic saturation when driven in that way. The weight of the wheel (113) plus the tension in the blade (101) assists the downward progress of shaft (103) and may accelerate its motion beyond that provided by gravity alone.

There may be residual friction between the blade and the still spinning driver and idler wheels. Those parts may take some seconds to come to a halt, and may be stopped more quickly such as by application of brakes and by disconnecting the motor (115) from a supply of electricity or reversing it if it is suitable for such operation.

In this version, the band saw can be reset after an incident is over and after the motor and idler have certainly stopped (when current though solenoid (111) has ceased), is to manually push the handle (112) to the left as referred to FIG. 1, so that the shaft (103) resumes its higher, over-centre alignment parallel to the axis of rotation and the cutting blade is again stretched into frictional contact with the two wheels.

Inclusion of process control means allows a systematic check list to be used at each station and for each shift or change of operator, in order to raise the level of safety provided. For example the blade can be brought up to speed and the duration of a stopping procedure can be checked by machine, to ensure that the band saw is safe. A display screen driven by the computer may be made to show the state of the check list and what must next be done, although during normal operation the screen may simply show a brand name or be blank. The list can include "show me your blue gloves" for example, just in case an operator intends to work bare-handed.

A check list could be wired into an interlock that prevents the motor from starting until for example it has proven that it is in fact capable of detecting and responding to presence of a blue area inside any designated zone. The blade would not be activated at this time. But if a new operator wanted to become confident with the band saw, the moving blade and the braking system can be operated in a test situation without harm.

Details of an "action plan" for responding to every signal that warns of a transgression of a hazardous zone or any proportional response to other movements (without actually generating a SIGNAL) may require human elements including worker's union requirements to be considered. The device is capable of reporting every movement to a monitoring device so that a manager is made aware of a tired operator's rising rate of transgressions of the safe zones.

VARIATIONS

Blue has been specified as a desirable glove colour for this machine vision process because blue gloves are already in wide use as a safety measure for visual purposes; because blue matches a channel of an RGB camera, and because a predominantly blue light is distinct for machine vision purposes from red, yellow, and white light as returned from meat products under white light. A fluorescent "dayglow yellow" glove is one of many possible alternatives.

The ubiquitous band saw has been described here. A "motor on top" version is a simple conversion of the FIGS. 2-8 embodiment. Other powered cutting tools used in the meat industry, including circular saws, are susceptible of like improvement.

By use of "graded proximity", whether incremental or not, the incident detector may be arranged to respond in a graded manner to a severity of any incident, by making use of computational procedures. As the operator's body or hand gets closer to the moving knife, severity is graded as more intense.

RESULTS

Figure 9A:
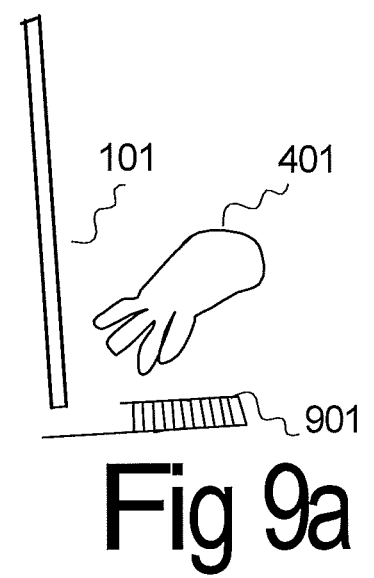
Figure 9B:
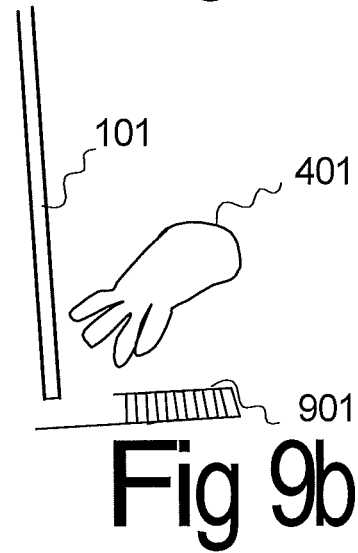
Figure 9C:
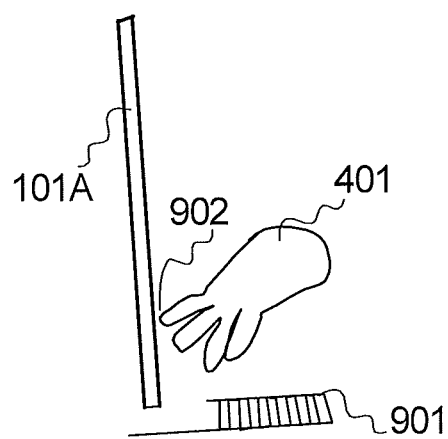

See FIGS. 9a, 9b and 9c, drawn from stills, which show three consecutive frames showing the reaction of the apparatus as described in FIGS. 2-8 to a fast-approaching blue-gloved hand. These were was filmed with an Iphone 5®, assumed to have a frame rate of 33 mS per frame. A test blade bearing painted cross-stripes and no teeth was operated. The frame in FIG. 9a does not show any visible braking response in the machine and no markings on the blade can be seen. The hand was 4-5-5 cm from the blade. The original of the next frame used for FIG. 9b showed that braking had started because the rear section of the band had become deviated sideways, but again, and no markings on the blade can be seen. The original of the last frame in FIG. 9c showed the cross stripes drawn on to the blade as partially sharp and partially blurred; the blade had halted during the exposure.

ADVANTAGES

Part 1: Detection means. Advantages of this invention over the prior art include:
(1) It is a "video curtain" kind of protection requiring no changes be made to the way that the hazardous equipment is used and no physical obstructions are added.
(2) The object to be optically sensed is already widely used—namely a flexible (rubber or latex) blue glove. Unlike prior-art use of conductive gloves for which actual contact is a pre-requirement for a braking operation and for which a connecting wire might fail, a blue glove is a fail-safe option. "Check-list" functions may be included in software.
(3) Hand injuries are avoided by anticipating contact; either by simply detecting that a gloved hand is within a dangerous zone as assessed in an X-Y plane; better by use of a three-dimensional protected area using 3-D processing and a pair of cameras to derive position in an X-Y-Z volume, and in addition by evaluating movement of the detected object across the image into a course taken in the future (X-Y-Z-T), so that even a quick accidental movement of the gloved hand is properly assessed and protection is applied if a risk of injury is determined.
(4) Stopping the blade using the apparatus carries no penalty because the blade is not damaged as a result of the sudden stop.
(5) The operator benefits from working under the copious white light used to illuminate the scene.
(6) Computer processing is inherently capable of anticipating and grading any incident particularly to determine if an immediate-halt signal must be made. Signs of a tired or otherwise dangerous operator as actual blade stoppages or near misses; one by one or as a summary can be related to a manager through an intranet. Fatigue, illness, or the like can make a particular person unusually susceptible to injury on particular days.
(7) The present invention reduces injury, reduces insurance costs, and reduces down time as a result of inadvertently caused injury to skilled operators.
(8) Band saws in educational establishments teaching wood work to children would benefit from this safety apparatus.
Part 2: Braking means. Advantages of this invention over the prior art include:

(9) that the blade of the bandsaw is disengaged from rotating parts of the band saw (including idler wheel, drive wheel, shaft and motor armature) thereby reducing the mass that has to be brought to a rapid stop. That allows a faster halt, even while the wheels are still spinning, with lower requirements imposed on brakes. In particular the integrity of the blade itself is not affected. Blade replacement is not required. If the blade was to break, flying parts may cause injury or damage or contaminate the food materials being dismembered.
(10) that the mechanically resettable mechanism is not complex and, being comprised of mechanical parts and solenoids, is compatible with the capabilities of most service organizations.
(11) That the invention allows a cutting machine to be used by an experienced operator without impediment as would be caused if a physical guard was placed around the band saw blade or gloves connected to wires had to be used.

Finally it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the accompanying claims.

We claim:
1. A powered machine of a type configured to be operated by one or both hands of a human operator when presenting material for cutting or shaping, within a working space that forms a hazardous zone defined by a height, a width, and a depth and in a position in relation to a frame of the machine, the machine comprising:
   a saw blade formed as a flexible band bearing saw teeth and passing in frictional contact around a drive wheel that is driven when in use by a motor comprised of a saw drive, the saw blade passing though the working space and passing around an idler wheel; and
   a safety protection apparatus that generates an output signal upon detection of a hazardous event within the hazardous zone when the powered machine is in use;
   an actuator device, including
      a decoupling actuator disposed in a manner so as to act directly upon the saw blade to disengage the saw blade from the saw drive, and
      a braking actuator that applies a brake to the saw blade,
   the decoupling actuator and the braking actuator configured to operate in combination to halt a motion of the saw blade,
   wherein the decoupling actuator includes a first actuator that resiliently maintains a first axle supporting the idler wheel in a first position farther from a second axle of the drive wheel such that, when in use, the saw blade is maintained under a working tension and the saw blade is coupled to both the drive wheel and the idler wheel via static friction until receiving the output signal from the safety protection apparatus, upon which the first actuator, through an over-center mechanism, removes support from the first axle so that the first axle moves to a second position closer to the second axle thereby removing the working tension from the saw blade and decoupling the saw blade from both the drive wheel and the idler wheel.
2. The powered machine as claimed in claim 1, wherein the first axle of the idler wheel is maintained in position by an over-center latch held in place against a force imposed by tension within the saw blade by the first actuator.

3. The powered machine as claimed in claim 1, wherein the first axle of the idler wheel is configured to be reset under a manually initiated self-resetting procedure that restores tension to the saw blade.

4. The powered machine as claimed in claim 1,
wherein the saw blade is operatively disposed to pass through the braking actuator, which includes a brake assembly with at least one brake shoe, and
wherein a second actuator is operatively connected to the brake assembly and is configured to hold the brake assembly in a disengaged mode when the second actuator is energised against compression spring pressure thereby allowing the saw blade to pass, and
upon receiving the output signal from the safety protection apparatus, the second actuator is de-energised and thereby permits the compression spring to force the brake assembly to close around and grip the saw blade so as to apply friction against the saw blade by contact with the brake shoe.

5. The powered machine as claimed in claim 3, wherein the actuator device brings the saw blade to a halt within 40 milliseconds after receiving the output signal.

6. The powered machine as claimed in claim 4, further comprising:
self-monitoring means for ensuring a safe maximum braking time is not exceeded, the self-monitoring means configured to bring the saw blade up to an operating speed while monitoring a saw movement speed, and then causes the output signal to be generated to cause the blade to stop, and further verifies that the saw blade has stopped within a predetermined time limit.

7. The powered machine as claimed in claim 1,
wherein, when the powered machine is in use, a pivotally mounted tooth holds a first block slidably moveable along vertical bars and resiliently supports, via a compression spring, a movable second block that bears a movable axle supporting the idler wheel,
wherein, when in the first position, the tooth is supported in place by the over-center mechanism including an over-center latch including a contact roller pivotally supported on a beam held in an over-center position around a pivot until the beam is pushed past the over-center position by a first solenoid actuator energized in response to the output signal, whereupon the working tension in the saw blade gives rise to a release force applied at the tooth and causes the idler wheel to fall and thereby remove tension from the saw blade and decouple the saw blade from the idler wheel.

8. The powered machine as claimed in claim 7, wherein the first axle supporting the idler wheel is configured to be reset under a manually initiated self-resetting procedure that restores tension to the saw blade and restores the over-center latch to the over-center position.

9. The powered machine as claimed in claim 4, wherein the second actuator is capable of being set into a disengaged mode by a pneumatic cylinder that applies a compressive force to the compression spring to the saw blade whereupon the solenoid is maintained in an energized state until the output signal is received.

10. The powered machine as claimed in claim 4, wherein the decoupling actuator in sequential combination with the braking actuator apparatus brings the saw blade to a halt within 40 milliseconds after receiving the output signal.

11. The powered machine as claimed in claim 4, wherein a self-monitoring procedure, for ensuring that a safe maximum braking time is not exceeded, includes bringing the blade up to an operating speed while monitoring a saw blade movement speed, then generating the output signal to cause the blade to stop, and verifying that the saw blade has stopped within a predetermined time limit.

12. The powered machine as claimed in claim 4, wherein the second actuator is a solenoid.

* * * * *